United States Patent [19]

Bell

[11] Patent Number: 5,784,525
[45] Date of Patent: Jul. 21, 1998

[54] IMAGE CAPTURE APPARATUS WITH SOUND RECORDING CAPABILITY

[75] Inventor: Cynthia Sue Bell, Webster, N.Y.

[73] Assignee: Eastman Kodak Company, Rochester, N.Y.

[21] Appl. No.: 815,776

[22] Filed: Mar. 12, 1997

Related U.S. Application Data

[63] Continuation of Ser. No. 450,445, May 25, 1995, abandoned.

[51] Int. Cl.⁶ .................................................. H04N 5/917
[52] U.S. Cl. .................... 386/107; 348/232; 396/312
[58] Field of Search ....................... 386/39, 54, 96, 386/97, 98, 99, 100, 101, 102, 103, 104, 105, 106, 107; 358/909.1, 906; 348/232; 396/312; 360/1, 3; H04N 5/225, 5/76, 5/92, 9/79

[56] References Cited

U.S. PATENT DOCUMENTS

| | | |
|---|---|---|
| 4,905,029 | 2/1990 | Kelley . |
| 4,983,996 | 1/1991 | Kinoshita . |
| 5,032,918 | 7/1991 | Ota et al. . |
| 5,099,262 | 3/1992 | Tanaka et al. . |
| 5,128,700 | 7/1992 | Inoue et al. . |
| 5,130,812 | 7/1992 | Yamaoka .................................. 386/101 |
| 5,214,516 | 5/1993 | Okino et al. .............................. 360/6 |
| 5,276,472 | 1/1994 | Bell et al. . |
| 5,313,235 | 5/1994 | Inoue et al. .............................. 360/2 |
| 5,363,157 | 11/1994 | Cocca ...................................... 396/312 |
| 5,363,158 | 11/1994 | Stoneham . |
| 5,387,955 | 2/1995 | Cocca . |
| 5,389,989 | 2/1995 | Hawkins et al. . |
| 5,489,955 | 2/1996 | Satoh et al. ............................. 396/312 |
| 5,521,663 | 5/1996 | Norris, III ............................... 396/312 |

*Primary Examiner*—Andrew I. Faile
*Assistant Examiner*—Aung Moe
*Attorney, Agent, or Firm*—Charles E. Snee, III; Gordon M. Stewart

[57] ABSTRACT

An image capture apparatus includes means for recording an image of a scene and means for recording audio information. The camera further includes means for determining that a request has been made for the recording means to record an image and means for ascertaining whether or not audio information has already been recorded for the requested image recordation.

15 Claims, 3 Drawing Sheets

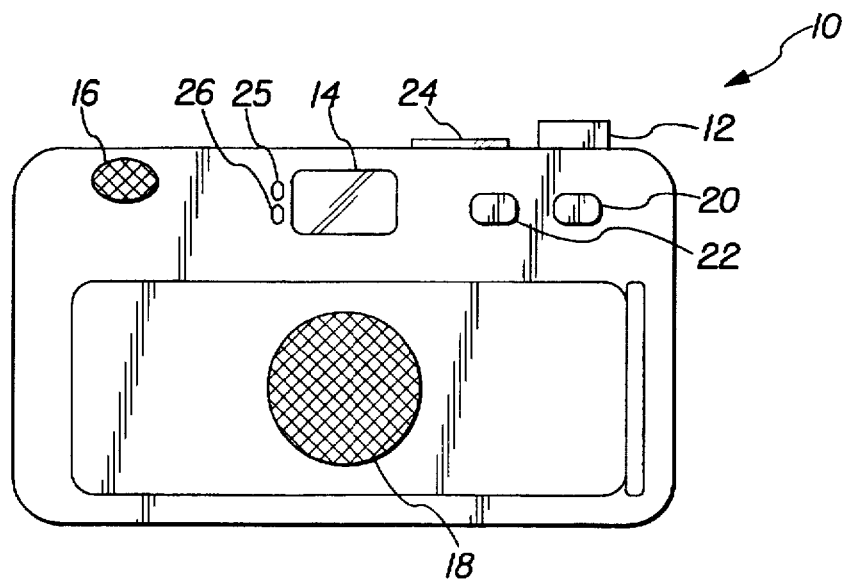
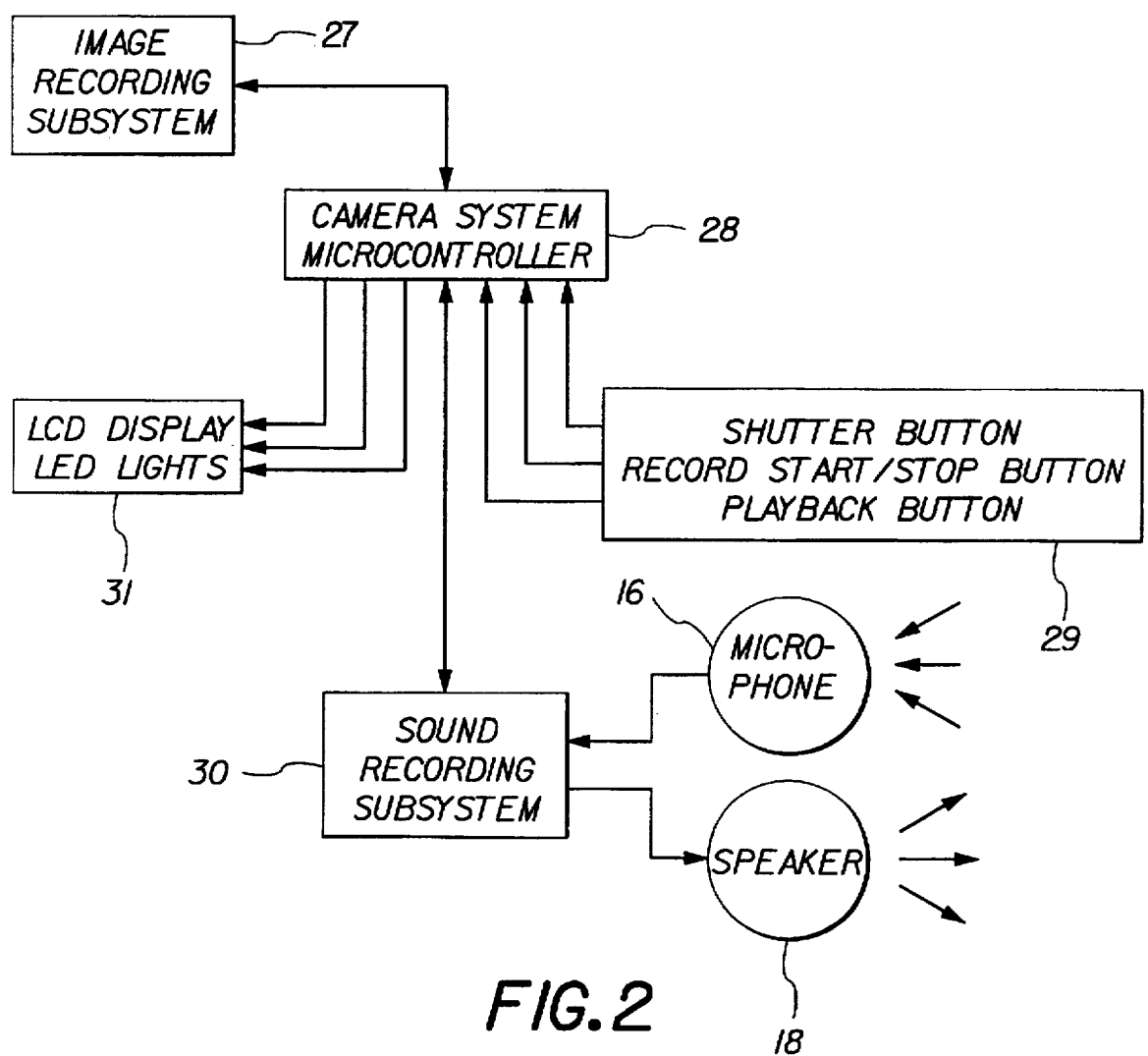
FIG.1
FIG.2

IMAGE CAPTURE APPARATUS WITH SOUND RECORDING CAPABILITY

This is a Continuation of application Ser. No. 08/450,445, filed 25 May 1995, now abandoned.

FIELD OF THE INVENTION

The invention relates generally to the field of image capture, and in particular to image capture apparatus which also record sound. More specifically, the invention relates to an image capture apparatus which knows whether or not sound has already been recorded for a requested image capture.

BACKGROUND OF THE INVENTION

Cameras that record sound are known in the art, but key issues have been overlooked: how to enable the user to capture sound conveniently, giving the user control over sound content, and yet not interfering with picture-taking readiness.

U.S. Pat. No. 5,276,472 (the '472 patent), entitled Photographic Film Still Camera System with Audio Recording, describes a camera that can record and playback audio information. In the '472 patent, audio information is captured and reviewed by the photographer before picture taking. The audio information is then recorded by a magnetic record head in the camera onto a magnetic layer on the film, following exposure of the corresponding latent image, as the camera advances the film to the next frame.

Sometimes, camera users need to take a picture quickly and want to record audio information after picture taking. In this situation, with the camera disclosed in the '472 patent, the recorded sound would be incorrectly associated with the following picture. Further, during the time required to prepare the audio data and write it onto the magnetic layer, the camera user would be unable to take other pictures. When camera users want to re-do their audio recordings, which happens a significant amount of the time, the film would have to be repositioned in the optical path to be aligned with the camera's magnetic write head for re-recording. This would also take the camera out of the picture taking ready mode.

U.S. Pat. No. 5,099,262 (the '362 patent), entitled Camera Having Sound Recording Function, describes an electronic still camera that can record sound, but cannot play it back. In this camera, there are two modes of recording sound, both following the corresponding picture capture. In a first mode, the camera checks the position of a "recording switch" to see if the user wants sound. If so, the camera sets up a fixed duration 9.6 second self-timer. After the picture is captured, the sound capture begins and it continues while the self-timer is counting down. If the user wishes to record for less than 9.6 seconds, he indicates the end of recording by turning off and then back on again, a light and distance measuring switch. If he just turns off the light and distance measuring switch, the camera assumes that the recording should be aborted. During sound recording, if the user wishes to extend the recorded duration beyond 9.6 seconds, he may toggle another switch.

In a second mode of operation, the user takes a continuous series of pictures with no sound. After the last picture has been taken in this mode, the camera checks the position of a recording switch to see if the user wants sound. If so, the camera sets up the timer for 9.6 seconds and records until it times out or until the user turns off and then back on again the light and distance measuring switch indicating that he wants to end the recording. If he just turns off the light and distance measuring switch, the camera assumes that the recording should be aborted. This is the same ending procedure as described above for the first mode. The above method of sound recording is complicated, thereby greatly reducing the "user-friendliness" of recording sound with pictures.

U.S. Pat. No. 4,905,029 describes sound recording with an instant camera. The user interface for audio recording is not given in detail, but consists of the following steps: the user presses a button which enables sound recording and a 5 sec counter. The sound capture proceeds until the timer runs out, then stops. When this sound recording is accomplished, relative to when an image is recorded, is unclear.

U.S. Pat. No. 4,983,996, entitled Data Recording Apparatus for Still Camera, does not describe the user interface sequencing for audio recording specifically. It states that recording is enabled by a switch and playback is enabled by another switch.

U.S. Pat. No. 5,363,158, entitled Camera Including Optical Encoding of Audio Information, discloses a camera that optically records audio information on a photographic film containing corresponding image information. The recording of the audio segment can occur either before, after or during the exposure of each picture frame. In a manual mode, a camera operator presses a manual mode button which causes audio information to be recorded for as long as the operator holds down the button up to a preset maximum time. Having to hold down a manual record button the whole time during recording is inconvenient.

In an automatic mode, the operator presses an automatic mode button after which the operator must enter a time length for recording audio. Recording of audio then commences when a picture is taken and continues for the time length set by the camera operator. Having to manually input a time for recording can be (a) difficult for an operator to estimate in advance, and thus inconvenient, and (b) distracting to the camera operator, especially if the camera operator wants to quickly record an image.

In all of the prior art discussed above, which is incorporated herein by reference, the camera operator must either make a number of difficult decisions, such as how long to record audio before commencing recording an image, or the operator is presented with arduous means of controlling the content of the audio recording. Such additional decision making when recording images and sound can be confusing and distracting to a camera operator.

SUMMARY OF THE INVENTION

The present invention is directed to overcoming one or more of the problems set forth above. Briefly summarized, according to one aspect of the present invention, an image capture apparatus includes means for capturing an image of a scene and means for recording audio information. The camera further includes means for determining that a request has been made for the capturing means to capture an image and means for ascertaining whether or not audio information has already been recorded for the requested image capture.

By enabling the image capture apparatus to ascertain whether or not audio information has already been recorded for a requested image capture, the image capture apparatus can link the audio information to the captured image with no operator input, whether the audio information was recorded before or after the associated image capture. As such, the image capture apparatus is rendered more "user friendly".

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a back schematic view of a camera incorporating the present invention;

FIG. 2 is a block diagram displaying the various components of the camera of FIG. 1;

DETAILED DESCRIPTION OF THE INVENTION

Figure 3:
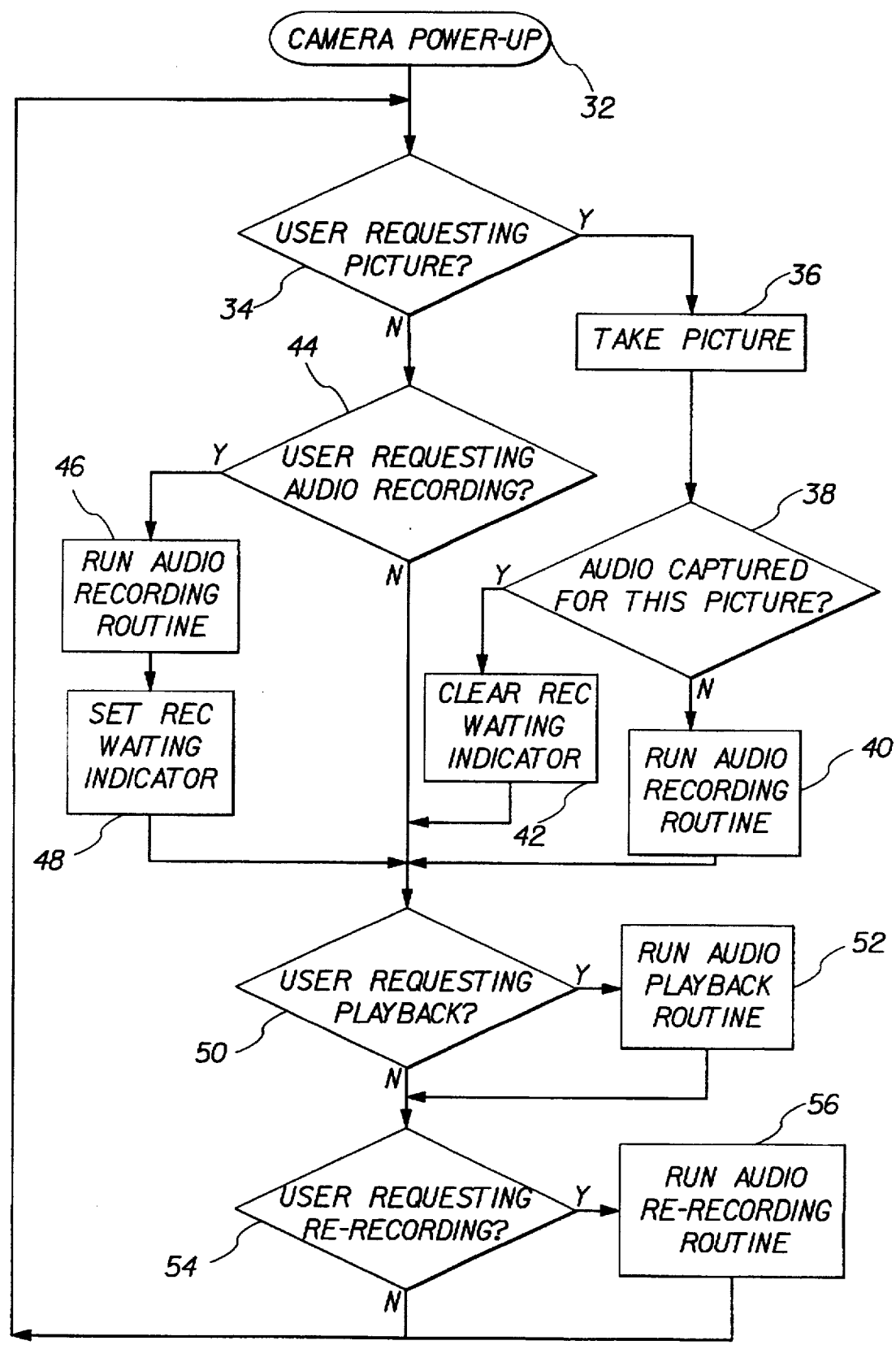
FIG. 3 is a flow diagram of logic and control used by the camera of FIG. 1 to record audio information.

It has been found that camera users generally prefer to have control over the starting and ending of audio recording. They do not like having the audio recording longer than necessary, as occurs in many fixed duration recording schemes. In this case, camera users feel they must be "quiet" until the recording time is up. Some camera users are concerned that they might forget to end the audio recording if something exciting has diverted their attention, so they also want a default time limit to end the audio recording. They also prefer to record audio information first, then take the corresponding picture. However, in instances where capturing a special moment must be done quickly, customers would prefer to have the audio information automatically initiated after picture taking or image capturing, as close in time to exposure of the image as possible.

The camera operating system approach described below satisfies all of the camera user needs mentioned and the prior art does not. The operating system is also advantageous in that many different users can intuitively use this camera without having to read a manual. Further, the operating system is simple and can be easily incorporated in camera products.

In general, the present invention relates to an interface for a camera with audio recording capability to conveniently make audio recordings and to enable a wide range of use styles. Upon turning on the camera, the camera user can choose to take a picture or to record an audio snippet. To record an audio snippet, the user momentarily presses a record button to commence recording. The camera user may end the recording by a number of means including a) momentarily pressing the record button again to disable the recording when he chooses, b) letting the camera automatically disable the audio recording after a maximum default time period has expired, or c) pressing a shutter button to take a picture.

At this point, sound has been recorded but an associated picture has not yet been taken, so an indicator for this state will appear, such as an LED or a symbol on a liquid crystal display on the camera, to remind the user that there is audio in the queue. The user may review and even rerecord the audio before proceeding to take a picture. When the shutter button is depressed, the camera checks to see if audio has already been recorded. If audio has already been recorded, the audio in the queue and the picture are linked to become a matched pair.

In the case when the user is in a rush to take a picture, the camera will capture an image, then automatically initiate sound recording following the image capture. The end of audio recording can then be caused in any of the three ways described above. The camera user interface also includes means for rerecording audio information and playing back audio.

A camera apparatus 10 shown in FIG. 1 includes the basic elements for capturing images and recording audio snippets. In addition to the typical camera user interface elements, such as a shutter button 12 and a viewfinder 14, the camera includes a microphone 16, a speaker 18 and two user interface buttons 20,22. The buttons hereafter will be referred to as a RECORD Start/Stop button 20 and a PLAYBACK button 22.

Also included in the camera are a liquid crystal display (LCD) 24 for relaying information, such as the audio recording status, to the camera user. A pair of light emitting diodes (LEDs) 25, 26, adjacent viewfinder 14, may alternatively be used to relay the audio recording status to the camera user. LED 25 is enabled to indicate a "REC WAITING" state which informs a camera user that audio information has been recorded but an image, corresponding to the recorded audio information, has not yet been captured. LED 26 is enabled during actual audio recording to indicate to the camera user that a recording state is in progress ("REC-ON"). LEDs 25, 26, or a further pair of LEDs (not shown), can be located in viewfinder 14 to relay information to the camera user when the user is looking through the viewfinder.

The camera electronic block diagram is shown in FIG. 2. Operational control of the camera is provided by a camera system microcontroller 28, which can be a typical device such as the Motorola MC68HCO5. User inputs 29 to camera system microcontroller 28 include shutter button 12, RECORD Start/Stop button 20, and PLAYBACK button 22. Outputs 31 from microcontroller 28 are fed to LCD 24 and LEDs 25, 26. Audio information is detected by microphone 16 and fed into a sound recording subsystem 30 which interfaces with microcontroller 28.

Sound recording subsystem 30 can be a digital audio to solid state storage system as described in U.S. Pat. No. 5,032,918; an analog audio storage subsystem such as the single chip solutions by Information Storage Devices (example chip #ISD2590); a digital audio to magnetic storage system as described in U.S. Pat. No. 5,276,472 when used with a multirecording, non-volatile electronic buffer; a digital audio to latent image storage system as described in U.S. Pat. No. 5,389,989; or another audio data storage technology. All of the patents referenced in this paragraph are incorporated herein by reference. Sound recording subsystem 30 drives an audio signal to speaker 18 for playback of recorded audio information. An image capturing or recording subsystem 27 also interfaces with microcontroller 28. Image capturing subsystem 27 can be a conventional photographic film system or an electronic image capture system, both of which are well known by those skilled in the art and operate in their conventional manner. As such, further discussion of the details of image capturing subsystem 27 is deemed unnecessary.

FIG. 3 shows the camera logic and control operation flowchart utilized by microcontroller 28 and detailing the user interface for picture taking and audio recording. In a first block 32, camera 10 has just been turned on (powered up) by the user. This can be accomplished by the user operating an "on/off" switch (not shown), opening a lens cover, etc. The main loop control loop cycles through checks for user requests. At a step 34, a check is made to see if the camera user is requesting to take a picture by pressing shutter button 12.

If the camera user is not requesting a picture (has not pressed shutter button 12) the microcontroller proceeds to step 44 in which microcontroller 28 interrogates RECORD Start/Stop button 20 to see if button 20 has been momentarily actuated, thereby indicating the user's desire to record audio information. If the user has not momentarily operated button 20, the microcontroller proceeds to step 50. If the user has momentarily operated button 20, the microcontroller proceeds to step 46 in which the audio recording subroutine (FIG. 4) is executed to record audio information. After the audio recording subroutine has concluded, the microcontroller proceeds to step 48 where the "REC WAITING" state is indicated by enabling LED 25 and/or providing such indication via LCD 24. After enabling the "REC WAITING" indicator, the microcontroller proceeds to step 50.

At step 50 microcontroller 28 queries PLAYBACK button 22 to see if the user has momentarily operated button 22 to hear the last audio information that was captured. If the user is requesting playback, the microcontroller proceeds to step 52 where an audio playback routine is executed causing sound recording subsystem 30 to playback recorded audio information via speaker 18. If the user is not requesting playback, the microcontroller proceeds to step 54 where the microcontroller checks to see if the user is requesting re-recording of audio information over previously recorded audio information. To request re-recording, the camera user momentarily presses RECORD Start/Stop button 20 and PLAYBACK button 22 at substantially the same time. If the camera user has requested rerecording, the microcontroller proceeds to step 56 where a re-recording subroutine is executed to rerecord audio information. The microcontroller then loops back to step 34 to test for the next user input.

At step 34, a shutter button actuation by the camera user's indicates the user desire to take a picture and causes the microcontroller to proceed to a step 36 where microcontroller 28 causes image capturing subsystem 27 to capture an image. If the user chooses to take a picture, the microcontroller proceeds through all of the normal steps to capture an image. This may be a film exposure in a conventional film camera, a charge coupled device exposure for an electronic camera or appropriate methods for other imaging technologies.

Figure 4:
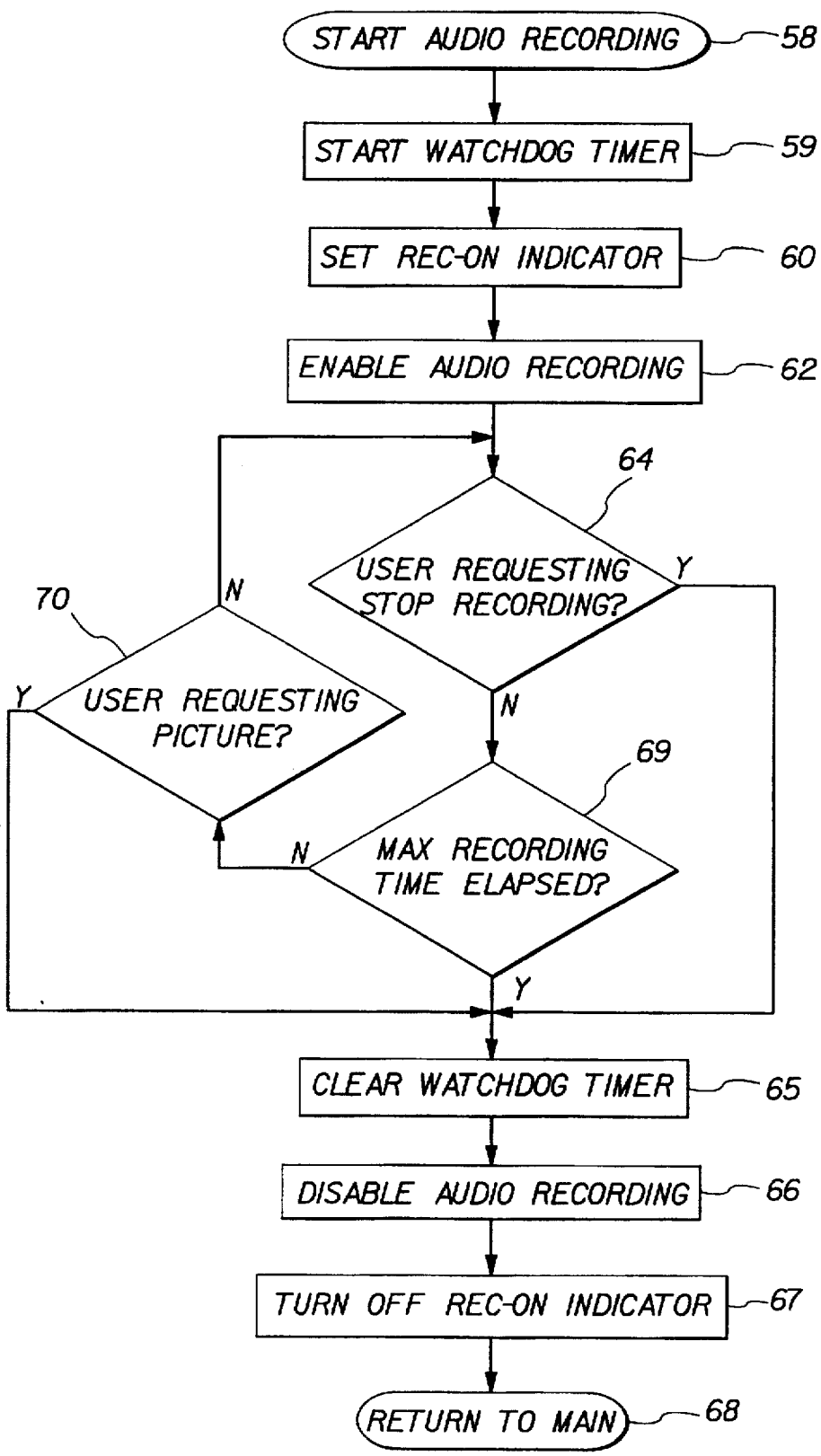
FIG. 4 is an audio recording subroutine utilized by the logic and control of FIG. 3.

At a step 38, microcontroller 28 determines whether or not audio has already been recorded for the just-recorded image by, for example, interrogating sound recording subsystem 30, checking an internal control variable inside the microcontroller or checking the status of the "REC WAITING" LED 25. If audio information has not been recorded, the microcontroller proceeds to a step 40 in which an audio recording subroutine, shown in FIG. 4, is executed to record audio information. If audio information has been recorded at step 38, the microcontroller proceeds to a step 42 in which the "REC WAITING" state is cleared by disabling LED 25 and/or removing this indicator from LCD 24. The microcontroller then continues to step 50 and proceeds as described above.

FIG. 4 shows the audio recording subroutine in detail. When the audio recording subroutine is executed from steps 40 or 46 (FIG. 3), the microcontroller proceeds to step 58 where the audio recording subroutine starts. At step 59, an internal timer (watchdog timer) of the microcontroller commences counting time in order to automatically stop audio recording if the audio recording proceeds for a maximum duration. The microcontroller then proceeds to step 60 where a "REC-ON" state is indicated by enabling LED 26 and/or by providing such indication on LCD 24. Next, the microcontroller moves to step 62 where audio recording is enabled by microcontroller 28 causing sound recording subsystem 30 to start recording audio from microphone 16.

From step 62, the microcontroller proceeds to step 64 where the microcontroller checks to see if the camera user has manually requested recording to be stopped. The user can manually stop audio recording by momentarily pressing RECORD Start/Stop button 20. If the camera user has not manually requested to stop audio recording, the microcontroller proceeds to step 69 where microcontroller 28 checks to see if a maximum recording time (e.g. 15 seconds) has elapsed by checking the watchdog timer. If the maximum recording time has elapsed, the microcontroller proceeds to step 65 where the watchdog timer is cleared and then to step 66 where audio recording is terminated. The microcontroller proceeds to step 67 where the "REC-ON" state indicator is disabled. At step 68 the microcontroller returns to the main program at step 48 or 50.

Returning to step 64, if the camera user has manually requested to stop audio recording, the microcontroller proceeds to step 65, bypassing step 69. Returning to step 69, if the maximum recording time has not elapsed, the microcontroller proceeds to step 70 where microcontroller queries shutter button 12 to see if the camera operator has pressed button 12 to request a new image to be captured. If the user is requesting a new image, the microcontroller proceeds to step 65. If the user has not requested an image to be captured at step 70, the microcontroller returns to step 64.

The re-recording subroutine of step 56 in FIG. 3 is similar to the audio recording subroutine of FIG. 4, but of course the new audio recording would be replacing a prior recording in sound recording subsystem 30.

It should be noted that the camera microcontroller 28 knows the picture number for each recorded audio "snippet" regardless of whether a particular audio "snippet" was recorded before or after the image was captured. This picture/audio correspondence information can be recorded with the audio information, as in U.S. Pat. No. 5,363,158, with the image, as in U.S. Pat. No. 5,387,955, with both the audio and the image, or separately, and allows the image to be associated with the correct audio information at a later time without mix-up.

In summary then, the camera works as follows. After the camera user turns the camera on, the user can take a picture by pressing the shutter button or record audio by momentarily pressing RECORD Start/Stop button 20. If the user chooses to record audio, a "REC-ON" is indicated to the user during audio recording. The audio recording is terminated by the earliest of a second momentary press of RECORD Start/Stop button 20, the elapsing of a maximum time period or the pressing of shutter button 12 to record an image. A "REC WAITING" state is indicated to the user after recording audio and held until an image is captured. If the camera user chooses to capture an image first, audio recording is automatically initiated by the camera following the image exposure and any film advance operations (if a film camera rather than an electronic camera) to avoid audio recording of film advance noise. Audio recording is then terminated by any of the three ways described in the previous paragraph.

The image capturing apparatus of the present invention is extremely user friendly regarding the recording of sound. The novice camera user need do nothing more than turn the camera on and take a picture in order to record sound. No other steps are required as in the prior art. Additionally, the user can rely on a default time-out feature or the commencement of another image capturing to automatically terminate sound recording. Experienced camera users can also manually commence and terminate recording, if desired, but this is not required. The present invention provides a great deal of control over audio recording, yet doesn't interfere with picture taking.

The invention has been described with reference to a preferred embodiment. However, it will be appreciated that variations and modifications can be effected by a person of ordinary skill in the art without departing from the scope of the invention. For example, a manually operable override switch can be provided on the camera to allow the camera user to disable all audio recording if so desired. All of the U.S. Patents identified in this patent application are incorporated herein by reference.

PARTS LIST
10 camera
12 shutter button
14 viewfinder
16 microphone
18 speaker
20 record button
22 playback button
24 lcd
25.26 leds
27 image recording subsystem
28 microcontroller
29 user inputs
30 sound recording subsystem
31 outputs
32–70 logic steps

I claim:
1. An image capture apparatus, comprising:
  a first subsystem for image capture;
  a first user interface element for activating said first subsystem;
  a second subsystem for sound recording;
  a microphone connected to said second subsystem;
  a second user interface element for activating said second subsystem;
  a controller connected to receive inputs from said first and second user interface elements and to control said first and second subsystems, said controller being programmed to perform:
    checking said first user interface element to see if a user of said apparatus is requesting said first subsystem to capture an image;
    when said first user interface element indicates that no image capture has been requested:
      checking said second user interface element to see if the user is requesting to record sound;
      when said second user interface element indicates that no sound recording has been requested, rechecking said first user interface element;
      when said second user interface element indicates that sound recording has been requested, running said second subsystem to make a sound recording;
    when said first user interface element indicates that an image capture has been requested, running said first subsystem to capture a requested image;
    after running said first subsystem, automatically checking said second subsystem to see if a sound recording previously was made for said requested image; and
    when said second subsystem indicates that no sound recording was previously made for said requested image, automatically making a sound recording for said requested image with said second subsystem.

2. An image capture apparatus according to claim 1, wherein said first subsystem is a photographic film system.

3. An image capture apparatus according to claim 1, wherein said first subsystem is an electronic image capture system.

4. An image capture apparatus according to claim 1, further comprising a third user interface element for requesting playback by said second subsystem, wherein said controller further is programmed to perform:
  after running said second subsystem to make a sound recording, checking said third user interface element to see if the user is requesting playback; and
  when said third user interface element indicates that playback has been requested, running said second subsystem to playback the sound recording.

5. An image capture apparatus according to claim 4, wherein said controller further is programmed to perform:
  checking said second and third user interfaces to see if the user is requesting re-recording;
  when the second and third user interfaces indicate that re-recording has been requested, running said second subsystem again to record sound.

6. An image capture apparatus according to claim 1, wherein said controller further is programmed to perform:
  after running said second subsystem to make a sound recording, rechecking said first interface element.

7. An image capture apparatus according to claim 1, wherein said controller is further programmed to perform:
  during running of said second subsystem to make a sound recording, stopping said second subsystem when said first user interface element indicates that the user of said apparatus is requesting said first subsystem to capture an image.

8. An image capture apparatus according to claim 1, wherein said further is programmed to perform:
  during running of said second subsystem to make a sound recording, stopping said second subsystem when said second user interface element indicates that the user of said apparatus is requesting that recording be stopped.

9. An image capture apparatus according to claim 1, wherein said further is programmed to perform:
  during running of said second subsystem to make a sound recording, stopping said second subsystem upon expiration of a set time period.

10. An image capture apparatus according to claim 1, wherein said controller performs automatically when the user turns on the apparatus.

11. An image capture apparatus according to claim 1, wherein the image capture is a single picture.

12. An image capture apparatus according to claim 1, wherein the controller, after running said first subsystem, automatically checks said second subsystem to see if a sound recording previously was made for said requested image, by checking an internal control variable inside the controller or the status of a record waiting indicator.

13. In an image capture apparatus, an image capture method, comprising:
  checking to see if a user of said apparatus is requesting capturing an image;
  when no image capture has been requested:
    checking to see if the user is requesting to record sound;
    when no sound recording has been requested, rechecking to see if the user is requesting capturing an image;

when a sound recording has been requested, making a sound recording;

when an image capture has been requested, capturing a requested image;

after capturing an image, automatically checking to see if a sound recording previously was made for said requested image; and when no sound recording was made for said requested image, automatically making a sound recording for said requested image.

14. A method according to claim 13 wherein the image captured is a single picture.

15. A method according to claim 13 wherein, in the step of automatically checking to see if a sound recording previously was made for said requested image, the automatic checking is performed by checking an internal control variable inside the controller or the status of a record waiting indicator.

* * * * *